(12) United States Patent
Kim et al.

(10) Patent No.: US 9,088,903 B2
(45) Date of Patent: Jul. 21, 2015

(54) DYNAMIC ROUTING UNDER EXTREME COGNITIVE JAMMING ENVIRONMENTS

(71) Applicant: The Boeing Company, Chicago, IL (US)

(72) Inventors: Jae H. Kim, Bellevue, WA (US); Bong K. Ryu, Poway, CA (US); Claudiu B. Danilov, Irvine, CA (US); Aleksandar Jovancevic, Clifton, VA (US); Orlie T. Brewer, Issaquah, WA (US); Reza Ghanadan, Bethesda, MD (US)

(73) Assignee: THE BOEING COMPANY, Chicago, IL (US)

( * ) Notice: Subject to any disclaimer, the term of this patent is extended or adjusted under 35 U.S.C. 154(b) by 89 days.

(21) Appl. No.: 13/899,550

(22) Filed: May 21, 2013

(65) Prior Publication Data

US 2014/0347978 A1 Nov. 27, 2014

(51) Int. Cl.
  *H04W 4/00* (2009.01)
  *H04W 28/02* (2009.01)
  *H04L 12/707* (2013.01)

(52) U.S. Cl.
  CPC ........... *H04W 28/0231* (2013.01); *H04L 45/22* (2013.01)

(58) Field of Classification Search
  None
  See application file for complete search history.

(56) References Cited

U.S. PATENT DOCUMENTS

| | | | |
|---|---|---|---|
| 6,115,580 A * | 9/2000 | Chuprun et al. | 455/1 |
| 2004/0142670 A1 * | 7/2004 | Ciccarelli | 455/214 |
| 2005/0101329 A1 * | 5/2005 | Gallagher | 455/436 |
| 2008/0137624 A1 | 6/2008 | Silverstrim et al. | |
| 2008/0293353 A1 * | 11/2008 | Mody et al. | 455/1 |
| 2010/0283832 A1 * | 11/2010 | Lin | 348/46 |
| 2013/0023201 A1 * | 1/2013 | Coleman et al. | 455/1 |

FOREIGN PATENT DOCUMENTS

| | | |
|---|---|---|
| EP | 0913965 A1 | 5/1999 |
| EP | 1653687 A1 | 5/2006 |
| WO | 2010097738 A1 | 9/2010 |

OTHER PUBLICATIONS

RaviTeja Chinta, Tan F. Wong, and John M. Shea, "Energy-Efficient Jamming Attack in IEEE 802.11 MAC", Wireless Information Networking Group, University of Florida, Gainesville, FL 32611, Paper ID # 901525, 978-1-4244-5239-2/09,2009, IEEE.

(Continued)

*Primary Examiner* — John Blanton
(74) *Attorney, Agent, or Firm* — Ameh IP; Lowell Campbell; Elahe Toosi

(57) ABSTRACT

A system and methods for dynamic routing under extreme cognitive jamming environments are presented. Jammer signals emitted by a network protocol-aware cognitive jammer are scanned for at a router node in an ad-hoc wireless network, and jammer behaviors are detected based on signal characteristics of the jammer signals. A network dynamic pattern caused by the network protocol-aware cognitive jammer is classified based on the detected jammer behaviors observed over a period of time, and dynamic routing strategies of the first router node are adapted to achieve robust data delivery based on the network behavioral pattern. Data packets sent by the router node are routed to avoid nodes and routes that are affected by the jammer signals.

20 Claims, 10 Drawing Sheets

(56) References Cited

OTHER PUBLICATIONS

David J. Thuente and Mithun Acharya, "Intelligent Jamming in Wireless Networks with Applications to 802.11b and Other Networks", Wireless Information Networking Group, University of Florida, Gainesville, FL 32611, Paper # 1689.

Xin Liu, Guevara Noubir, Ravi Sundaram, San Tan, "SPREAD: Foiling Smart Jammers using Multi-layer Agility", College of Computer and Information Science, Northeastern University, Boston, MA 02115, 0743-166X/07, 2007, IEEE INFOCOM.

Extended European Search Report EP14161456.0 and Written Opinion dated May 30, 2014.

* cited by examiner

| STATE | POSSIBLE ACTION | COMMENT |
|---|---|---|
| 902 Normal | None, nominal network behavior | None |
| 904 Possible jamming condition | Switch to broadcast mode for transit traffic | This can be subdivided based on the level of certainty that the jamming is taking place |
| 906 Jamming detected | Increase the route cost through the affected node | The list of actions can be made dependent on the jammer class, for example, if the jammer is cognitive only control messages are affected and normal traffic is not, for constant jammer all traffic is affected |

FIG. 9

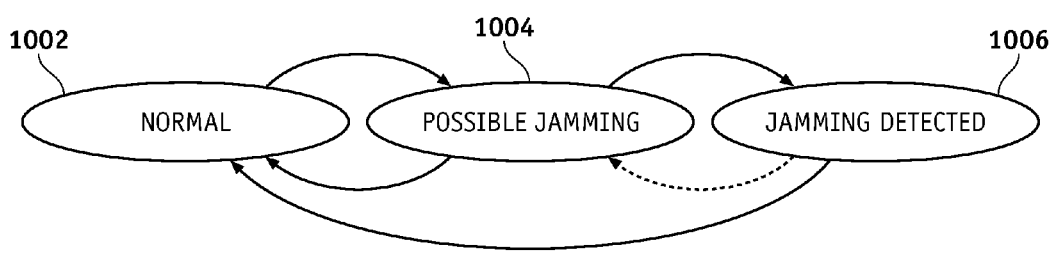

FIG. 10

DYNAMIC ROUTING UNDER EXTREME COGNITIVE JAMMING ENVIRONMENTS

GOVERNMENT RIGHTS

This invention was made with government support under N00014-12-C-0059 awarded by Department of Defense. The government has certain rights in this invention.

FIELD

Embodiments of the present disclosure relate generally to communication systems. More particularly, embodiments of the present disclosure relate to dynamic routing under extreme cognitive jamming environments.

BACKGROUND

Wireless networks are vulnerable to attacks by hostile radio frequency (RF) sources, especially intelligent (cognitive) jamming representing the growing threat of hostile interference targeting critical messages (i.e., control packets) of operational networking protocols. Such interruptions can cause disastrous degradation of the overall routing performance even if other networking conditions remain benign, and can't be easily detected due to the smartness of the jamming patterns.

SUMMARY

A system and methods for dynamic routing under extreme cognitive jamming environments are presented. Jammer signals emitted by a cognitive jammer such as a network protocol-aware cognitive jammer are scanned for at a router node in an ad-hoc wireless network, and jammer behaviors are detected, classified, and characterized based on signal characteristics and a historical pattern of the jammer signals. A network dynamic pattern caused by the network protocol-aware cognitive jammer is classified based on the detected jammer behaviors, and dynamic routing strategies of the first router node are adapted to achieve robust data delivery based on the network behavioral pattern. Data packets sent by the router node are routed to avoid nodes and routes that are affected by the jammer signals.

Embodiments have at least two unique and novel features: (i) A jammer characterization engine—to rapidly detect and accurately classify and characterize a wide range of network protocol-aware cognitive jammer (PACJAM) behaviors seen by individual nodes; (ii) PACJAM-Aware Adaptive Routing (PAAR)—to leverage the obtained knowledge to adapt, rapidly and proactively, dynamic routing strategies to achieve robust data delivery by avoiding the nodes and routes that contain the most interfering signals. PACJAM-Aware Adaptive Routing aims at robust data delivery under extreme environments including Disconnected, Intermittent, and Low (or Limited) bandwidth (DIL) and RF interferences by intentional, covert and cognitive jammers, or a combination thereof.

In an embodiment, a method for dynamic routing under extreme cognitive jamming environments scans for jammer signals emitted by a network protocol-aware cognitive jammer at a router node in an ad-hoc wireless network. The method also detects jammer behaviors based on signal characteristics of the jammer signals, and classifies a network dynamic pattern caused by the protocol-aware cognitive jammer network based on the jammer behaviors observed over a period of time. The method further adapts dynamic routing strategies of the router node to achieve robust data delivery based on the network dynamic pattern, and routes data packets sent by the router node to avoid nodes and routes that are affected by the jammer signals.

In another embodiment, a system for dynamic routing under extreme cognitive jamming environments comprises a router node, a receiver, a jammer characterization engine, and an adaptive router. The router node is in an ad-hoc wireless network, and the receiver scans for jammer signals emitted by a network protocol-aware cognitive jammer at the router node. The jammer characterization engine detects jammer behaviors based on signal characteristics of the jammer signals. The jammer characterization engine also classifies a network dynamic pattern caused by the network protocol-aware cognitive jammer based on the detected jammer behaviors observed over a period of time. The adaptive router adapts dynamic routing strategies of the router node to achieve robust data delivery based on the network dynamic pattern, and routes data packets sent by the router node to avoid nodes and routes that are affected by the jammer signals.

In a further embodiment, a non-transitory computer readable storage medium comprises computer-executable instructions for dynamic routing under extreme cognitive jamming environments. The computer-executable instructions scan for jammer signals emitted by a network protocol-aware cognitive jammer at a router node in an ad-hoc wireless network. The computer-executable instructions also detect jammer behaviors based on signal characteristics of the jammer signals, and classify a network dynamic pattern caused by the network protocol-aware cognitive jammer based on the detected jammer behaviors observed over a period of time. The computer-executable instructions further adapt dynamic routing strategies of the router node to achieve robust data delivery based on the network dynamic pattern, and route data packets sent by the router node to avoid nodes and routes that are affected by the jammer signals.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 9 is an illustration of an exemplary table showing states of a RouteEx system according to an embodiment of the disclosure.

FIG. 10 is an illustration of an exemplary state transition of a RouteEx system according to an embodiment of the disclosure.

DETAILED DESCRIPTION

Figure 1:
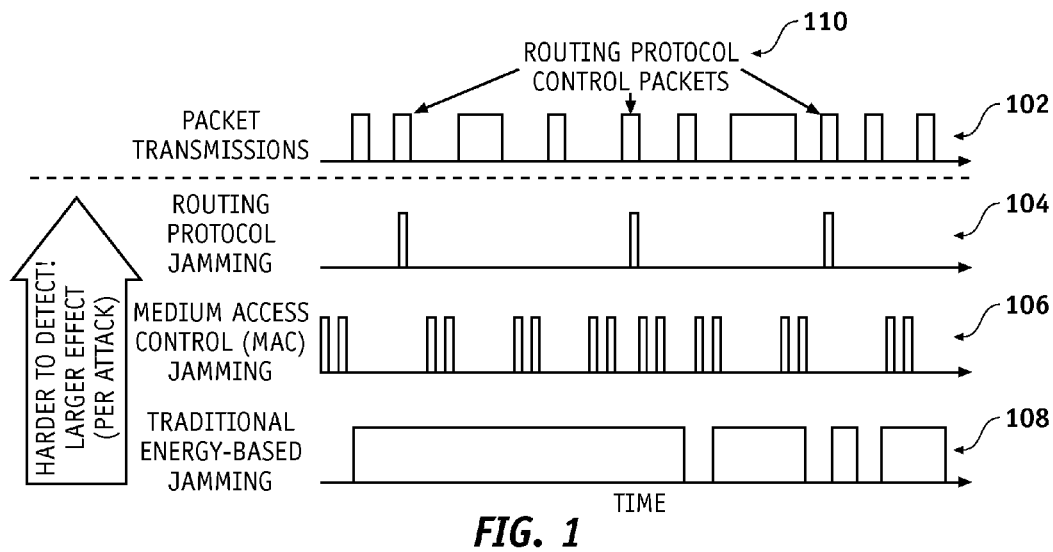
FIG. 1 is an illustration of classes of Protocol Aware Cognitive Jammers (PACJAM).

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to communication systems, network routing systems, network protocols, and other functional aspects of the systems (and the individual operating components of the systems) may not be described in detail herein.

Embodiments of the disclosure are described herein in the context of a practical non-limiting application, namely, an ad-hoc wireless network application. Embodiments of the disclosure, however, are not limited to such ad-hoc wireless network applications, and the techniques described herein may also be utilized in other applications. For example, embodiments may be applicable to a cellular wireless network, a satellite wireless network, a centrally wired/wireless network or a combination thereof. These and other operational networking protocols may be used for communication with a desktop computer, a laptop or notebook computer, a Droid™ phone, an iPhone™, a mainframe, a server, a client, or any other type of special or general purpose internally or externally enabled computing device as may be desirable or appropriate for a given application or environment.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

As mentioned above, wireless networks are vulnerable to malicious attacks by hostile RF sources, especially intelligent (cognitive) jamming representing growing threats of hostile interference targeting important messages (i.e., control packets) of operational networking protocols. Such interruption can cause disastrous degradation of the overall routing performance even if other networking conditions remain benign, and can't be easily detected due to smartness of jamming patterns and a possibly low energy level.

Dynamic routing techniques can be categorized in three classes: proactive (link state) protocols, reactive (on-demand) protocols, and broadcast (flooding) protocols. Existing routing techniques are ineffective under extreme cognitive jamming situations such as protocol-aware cognitive jammers because they can remain covert for a long period of time with minimal transmissions.

Existing routing protocols depend on well-known control packets and their patterns. When they are jammed by hostile interferences, i.e., intelligent adaptive jamming (cognitive jamming), existing protocols are at the mercy of their inherent reaction/response times that lead to severe performance degradation. This is attributed by the fact that these protocols are not able to discern hostile jammers from natural interferences caused by physical environments and other non-adversary RF sources.

Dynamic routing techniques have been developed and are operational in the category of self-organizing wireless networks, but virtually none of them can detect and avoid hostile interferences, i.e., intelligent adaptive jamming (cognitive jamming), that can seriously harm the network performance by targeting critical messages of operational network protocols, even if they are encrypted.

Embodiments of disclosure provide highly adaptive, robust and rapid responsive network capability against emerging intelligent (cognitive) and covert RF threats.

As mentioned above, RouteEx provides:

(i) Jammer characterization engine—to rapidly detect and accurately classify and characterize a wide range of network protocol-aware cognitive jammer (PACJAM) behaviors seen by individual nodes;

(II) PACJAM-Aware Adaptive Routing—to leverage the obtained knowledge to adapt, rapidly and proactively, dynamic routing strategies to achieve robust data delivery by avoiding the nodes and routes that contain the most interfering signals.

RouteEx is the first attempt to a dynamic routing solution against network protocol-aware cognitive jammer (PACJAM) that aims at robust data delivery under extreme environments including Disconnected, Intermittent, and Low-bandwidth (DIL) (or Disconnected, Intermittent, and Limited, Limited-bandwidth or Limited-communications) and RF interferences by intentional, covert and cognitive jammers.

RouteEx provides the following capabilities:

(i) rapidly and accurately detecting and classifying the RF interference signal features/profile (e.g., modulation type, center frequency, bandwidth) emitted by PACJAMs;

(ii) accurately characterizing behavioral patterns (e.g., frequency, spatial, temporal) of PACJAMs, (iii) dynamic routing strategies to achieve robust data delivery by avoiding the nodes and routes that contain the most interfering signals.

A PACJAM model specification and its simulation confirms that a PACJAM attacking routing protocols can cause severe performance issues that cannot be easily fixed through algorithmic changes alone. For example, simple jamming of Hello messages at 70% ratio of the packets reduces the end-to-end throughput by 60% in a "static" network (e.g., no mobility). A preliminary test with RouteEx described herein indicates a significant improvement in data delivery ratio under extreme cognitive jamming conditions.

Malicious attacks by hostile RF sources can seriously disrupt wireless communication links, especially in non-civilian applications, for the following reasons:

First, a wireless network is often deployed in a distributed manner in which a lack of infrastructure and central units makes it difficult to respond promptly to emerging attacks and implement effective security countermeasures.

Second, a broadcasting nature of wireless communications makes it extremely difficult to hide radio frequency activities from adversaries physically nearby who can observe the transmission and then attack.

Third, one of the growing threats of hostile interference is Protocol Aware Cognitive Jammer (PACJAM), which targets important messages of operational networking protocols, i.e., control packets designed to reserve channel access, updating topological information generated by individual network nodes or probing packets to learn the topology or link status. Such interruption can cause disastrous degradation of the overall routing performance even if other networking conditions remain benign.

Fourth, wireless networking protocols widely adopted by non-civilan systems such as military systems closely follow standardized specifications, thus exposing which messages are critical to the operation of the protocols, and in which patterns they are generated (periodic or event-driven).

Fifth, or more accurately, as a result of the third and fourth reasons stated above combined, PACJAMs attacking important (prioritized) messages can remain much more covert compared to traditional RF jammers. This leads to increased time and cost to locate and remove the jammers.

FIG. 1 is an illustration of classes of Protocol Aware Cognitive Jammers (PACJAMs). Channel-hopping feature is not captured in the FIG. 1. FIG. 1 shows, a packet transmission 102, a routing PACJAMs class 104, a medium access control (MAC) PACJAM class 106, and a traditional energy based jamming class 108. Dynamic routing techniques, especially for tactical wireless networks, have been developed and are operational in the category of self-organizing wireless networks (e.g., Mobile Ad-Hoc Networks or MANETs), but virtually none of them can operate satisfactorily under extreme networking conditions created by hostile interferences, i.e., intelligent adaptive jamming (cognitive jamming), from natural interferences caused by physical environments and other non-adversary RF sources.

While emerging capabilities provided by lower layer protocols such as Dynamic Spectrum Access (DSA) are introduced to combat cognitive jammers (e.g., spectrum follower) by adaptively switching agreed communication frequencies in a distributed manner, they themselves introduce new vulnerabilities due to their dependence on their own control messages.

For example, in the case of DSA, control packets 110 dedicated for negotiating and updating future communication frequencies are prime target for jamming, even if they are encrypted, provided that their patterns are predictable.

Embodiments of the disclosure focus on an impact of disrupting control messages of dynamic routing protocols for wireless networks (e.g., MANET) on their performance, and may not include lower layer protocols such as DSA.

Dynamic network routing protocols make use of control messages that probe the network state and carry information about it to other nodes in a network such as MANET. These messages are triggered by network events, in case they can be detected, or by timers (e.g., seconds or tens of seconds), in case other expected control messages are not received. PACJAM is expected to be able to identify those control messages, even if they are encrypted, because control messages usually follow a pattern that is dependent on the routing protocol used, and their patterns are widely published (thus predictable) if the protocols closely follow standardized or published specifications.

By targeting the anticipated control message transmissions, a PACJAM may (1) trigger additional, unnecessary control traffic that can cascade and use a large amount of the available bandwidth, and (2) disrupt the control traffic immediately after reaching a timer, thus bringing the protocol into a cascade of inactivity timers; this in effect forces the network routing to never converge.

Recent focus on the vulnerability of DSA schemes caused by attacking the control packets of DSA-based medium access is another class of PACJAM since it requires the "knowledge" of the protocols with predictable transmission patterns of their control packets 110. Attacking 802.11-based medium access control (MAC) protocols is yet another example. Compared to the class of PACJAM attacking MAC protocols such as the MAC PACJAM class 106, a class of routing PACJAM such as the routing PACJAM class 104, is potentially much more difficult to detect because they do not need to transmit as often as the MAC PACJAM class 106. Yet, the impact of successful disruption by the routing PACJAM class 104 per attack is felt over much longer time scale simply because the routing PACJAM class 104 do not need to transmit as often as the MAC PACJAM class 106.

The routing PACJAM class 104 protocols may cause severe performance issues that cannot be easily fixed through algorithmic changes alone. For example, successful jamming of Hello packets at a 70% ratio, a trivial task given a periodic nature of Hello packets for widely used MAN ET protocols such as Open Shortest Path First (OSPF) Wireless Interface or Optimized Link State Routing (OLSR), may reduce end-to-end throughput by about 60% in a "static" network (e.g., no mobility).

Figure 2:
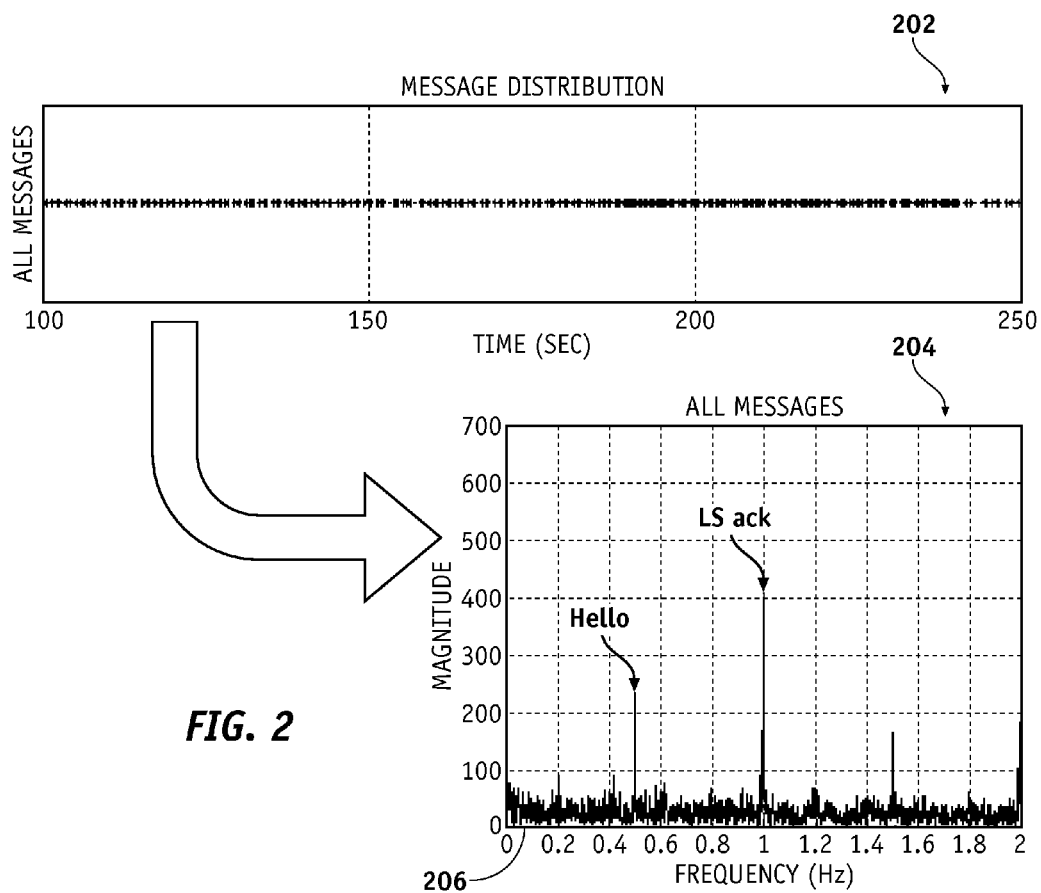
FIG. 2 is an illustration of a periodicity from a message timing.

FIG. 2 is an illustration of a periodicity from a message timing, showing a message time distribution 202 and a network traffic periodogram 204.

A goal of a jammer is to disrupt network operation. This goal can be accomplished through varying levels of sophistication ranging from continuous jammers which do not try do conceal their presence, through reactive jammers which in order to hide their presence and minimize the energy requirements transmit only when they sense the network traffic, to finally "smart" jammers which through the knowledge of the network protocol attempt to attack only the most critical infrastructure in order to generate maximum impact with minimum exposure.

Protocol Aware Cognitive Jammer (PACJAM) attempts to learn the network behavior and through the knowledge of the network protocol devise the best method of attack. The PACJAM model comprises three modes: listening, traffic analysis, and transmission.

Listening mode allows the jammer to observe the network behavior by listening to the traffic and recording a packet time of arrival, length and signal to noise ratio (SNR). In this mode the jammer is not broadcasting.

Figure 3:
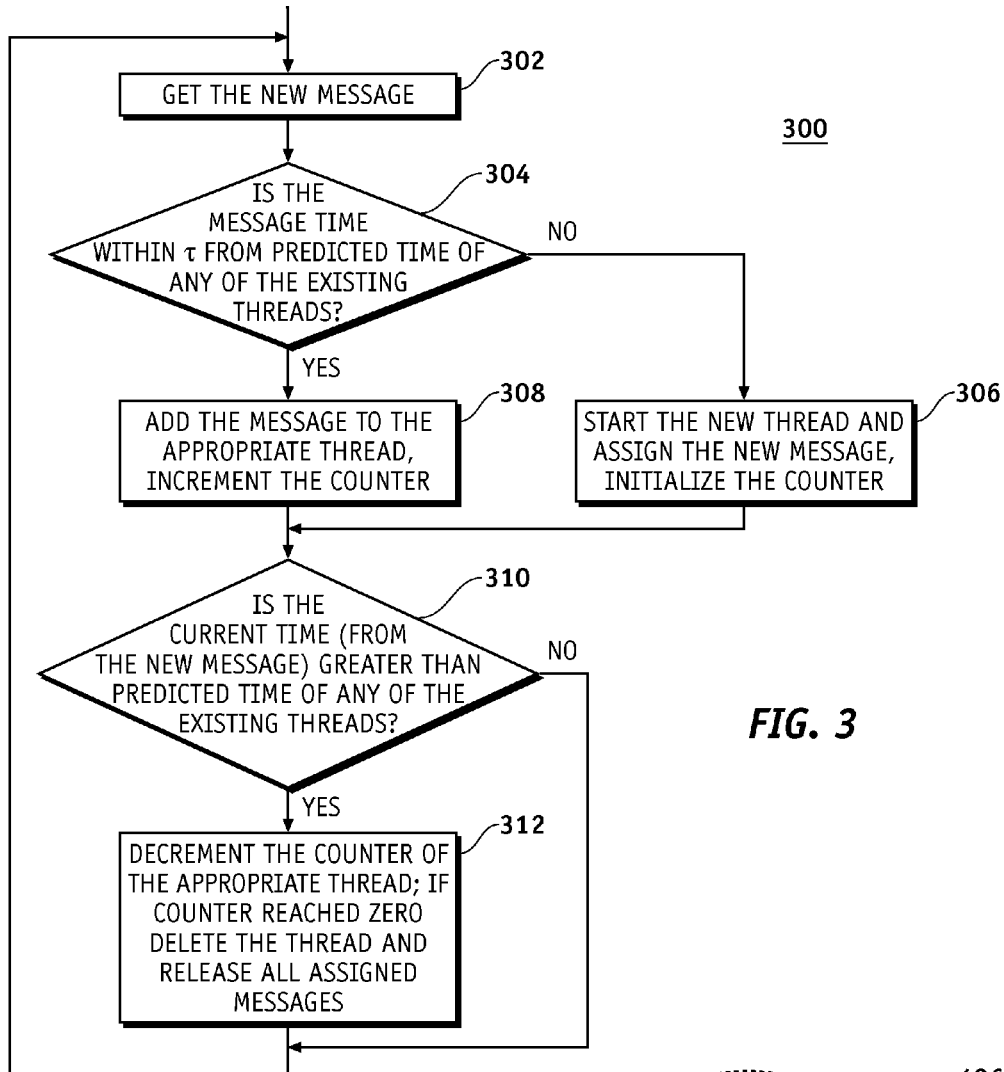
FIG. 3 is an illustration of a flowchart showing a process for identifying messages that fit selected periodicity.

After the listening mode is completed, during which enough packet data has been collected, the jammer switches to the traffic analysis mode. Knowing the Open Shortest Path First version 3 (OSPF3) protocol, the jammer looks for periodic packets that represent control messages such as the control packets 110 in FIG. 1 in the network. The message periodicity 206 can be inferred directly from the protocol parameters (e.g., "Hello" messages are broadcast every 2 seconds) or obtained by examining the network traffic periodogram 204. In any case, once the message periodicity 206 is selected, the exact set of messages with that period can be identified. The repetition period of these messages can be finely tuned to accommodate the mobility of nodes within the network. This procedure is repeated for all sets of periodic messages and all detected periodicities. FIG. 3 describes the process for identifying periodic messages.

Figure 4:
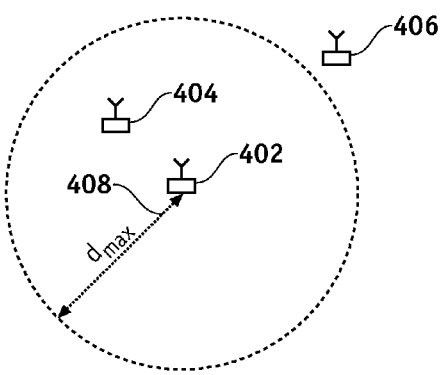
FIG. 4 is an illustration of a jammer and a node configuration.

FIG. 3 is an illustration of a flowchart showing a process for identifying messages that fit selected periodicity. FIG. 4 is an illustration of a jammer and a node configuration.

Thread may refer to a set of messages that have been linked together by having the repetition period that is currently being examined. The thread may also comprise a predicted time of a next message, which may be computed from the time of the last message in the thread and the message period, and the counter which approximately keeps track of how many messages have been received that are spaced by the repetition period. If a new message (task 302) is within a time $\tau$ from the predicted time (task 304) it is assigned to that thread and the counter is incremented (task 308).

Otherwise, a new thread is started, the new message is assigned and the counter is initialized (task 306). If a current time from the new message is greater than predicted time of any of the existing threads (task 310), the counter is decremented in (task 312). Otherwise process 300 leads back to task 302. Once the counter reaches a predefined limit it is not incremented anymore and the thread is considered acquired. On the other hand if no messages match the predicted time, the counter is decremented (task 312). Once the counter reaches zero, the thread is considered false and is deleted (task 312). When the thread is initialized, the counter value can be set to a non-zero value in order to accommodate small gaps in the stream of periodic messages.

At the end, the jammer is aware of the timing of each set of periodic messages along with the associated jitter and is capable of predicting when the next packet from that group will be transmitted. From the knowledge of the network protocol the periodic messages can be identified.

Finally, the jammer decides on a particular control messages to attack, and based on its type devises a strategy to follow. For example, by jamming three consecutive 'Hello' messages, the link state update is triggered at the jammed node. The goal of the jammer is to time its transmissions to collide with the network traffic. For example, the jammer 402 (FIG. 4) may need to transmit for $t_o - d_{max}/c - \tau < t < t_o + d_{max}/c + \tau + T$ in order to hit the packet of length T which starts within the time interval (from $-\tau$, to $+\tau$) with source node located anywhere within the distance of $d_{max}$ 408 from the jammer 402 where c is a propagation speed of RF signals.

The maximum transmission time is $T_{max}$ transmission=$2d_{max}/c + 2\tau + T$. Such a transmission will guarantee that the packet is completely covered no matter where the source node 404 and the destination node 406 are nodes in a network. To conserve power and improve covertness, instead of continuously transmitting, the jammer can emit several short pulses separated by not more than T in order to ensure that at least a part of the packet is hit. The idea is to interfere with the minimum amount of packet payload in order to overcome the capabilities of error correction mechanism if implemented.

Figure 5:
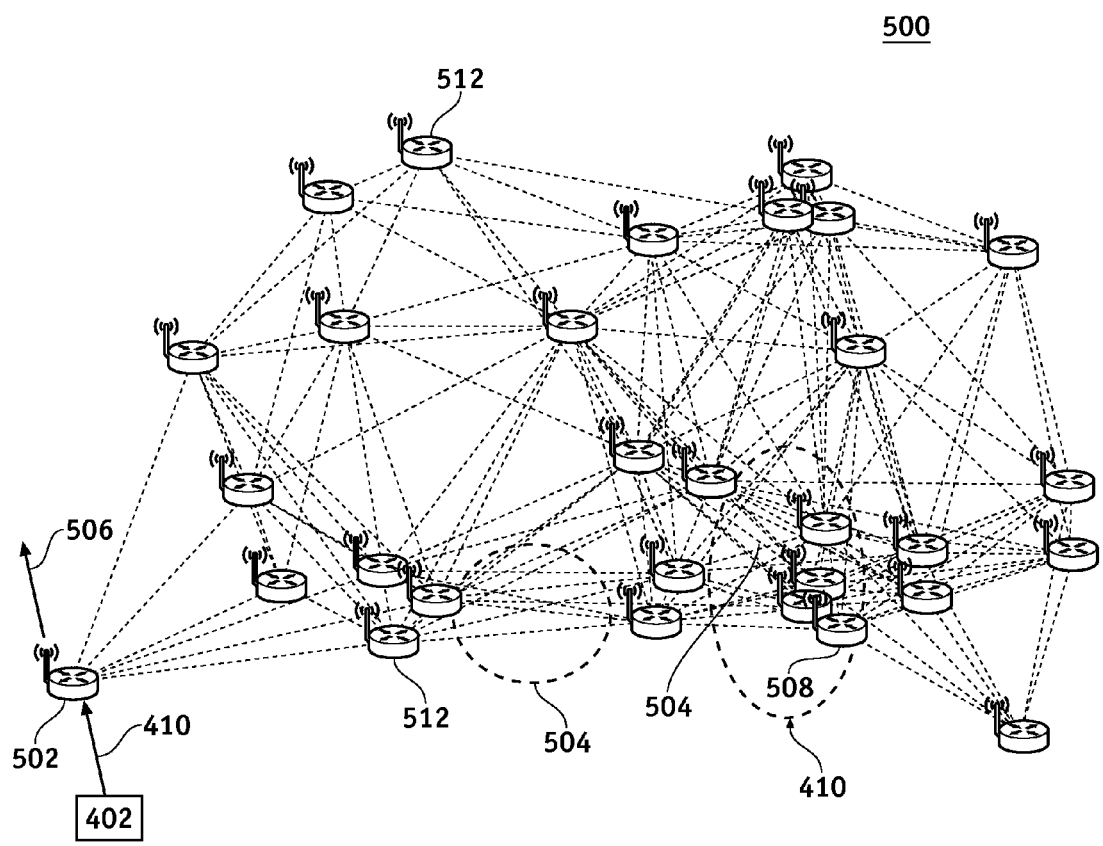
FIG. 5 is an illustration of starting positions of 30 second nodes showing initial communication link connectivity of each node to its neighbor set.

FIG. 5 is an illustration of starting positions of 30 second nodes showing initial communication link connectivity of each router node 512 to its neighbor set 504 in an ad-hoc wireless network 500. A network protocol-aware cognitive jammer such as the jammer 402 can emit the jammer signals 410 at the router node 502.

RouteEx design comprises a combination of multiple methods/strategies so that various design criteria are met to the highest degree possible as explained below.

An inherent property of OSPF MANET is its resiliency against single point of failure in any part of a network such as ad-hoc wireless network 500. As a result, this protocol attempts to recover from partial jamming as long as there is sufficient connectivity across the network. This self-healing property is similar to reaction to congestion in the network or to link drop-out due to mobility and limited radio range. However, this healing property takes some time depending on the severity of the jamming impact and the size of the area being jammed. According a research simulating several PACJAM scenarios, the resulting recovery attempt does not necessarily result in a stable network and the healing rate varies.

When adversary completely jams ALL control messages such as Hello packets, the network heals itself faster and becomes stable shortly after jamming starts. This is because the jammed control packets are consistent and routing protocol eliminates these problem links from routing tables in a consistent way. On the other hand, when jamming is only partially effective and some of the control messages are received by jammed nodes, it is harder for the OSPF protocol to drop the affected routes and it will take longer for the network to heal by itself.

One method for rapid response to PACJAM is a reactive approach such as local distributed provisional flooding (broadcasting). Main advantages of the local distributed provisional flooding for rapid response to PACJAM are that it is distributed and fast. Moreover, the local distributed provisional flooding preserves in-process traffic flows while the network is healing. Existing traffic flows crossing the jammed areas of the network are sustained within topological limits. The cost of this response is overhead associated with flooding within affected areas of the network.

Another method to re-route packets is to utilize strategic nodes in the network topology for low overhead fast recovery of new routes. The selection of these strategic nodes depends on the underlying MANET protocol. Examples comprise, without limitation, Multi-Point Relay (MPR) or special bridge nodes that assist in re-routing around jammed network nodes.

A further method comprises adding a proactive routing index to existing network routing protocol for increased diversity in routing and network load balancing. This process is similar to multi-route notion and introduces cost associated with network overhead to discover and maintain multiple routes across the networks. A more efficient multi-route protocol can be designed such that it only maintains multiple routes for selected high priority nodes in the areas most susceptible to jamming.

A further method comprises randomizing OSPF control information messages distributed in time and space. This helps with protection against PACJAM impact. The protection is especially helpful for regularly generated periodical Hello messages which are most easily detected by cognitive jammers.

A further method comprises encapsulating control packets inside traffic application level messages.

A further method comprises using network/transport coding such as Fountain Codes which are more robust and less detectable to jamming.

Figure 6:
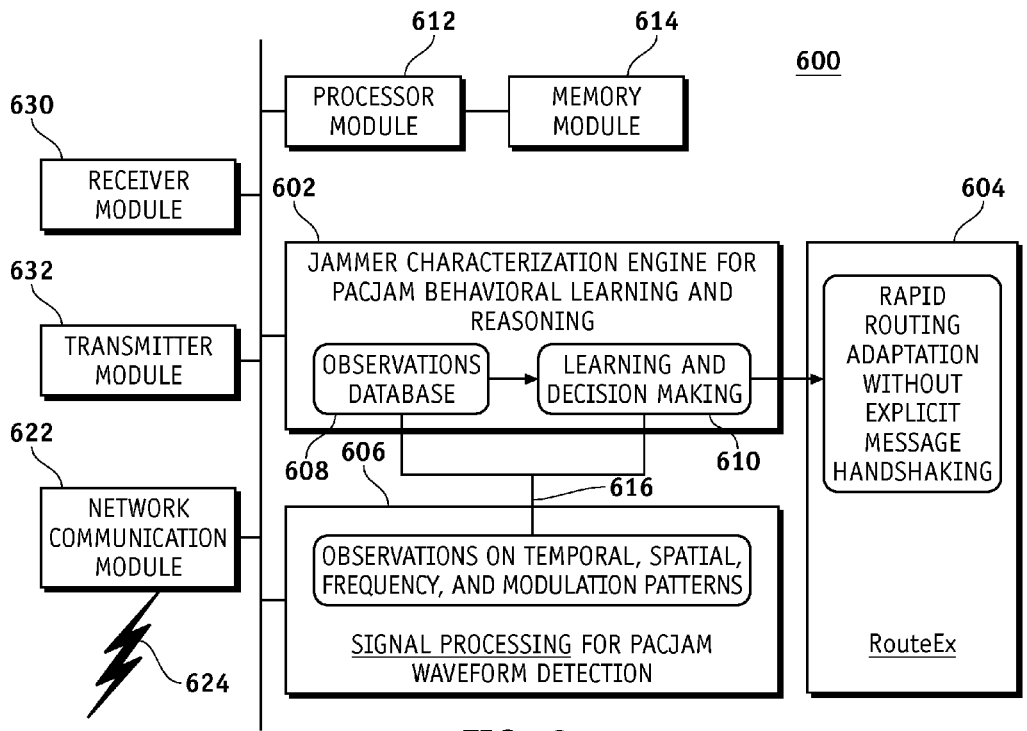
FIG. 6 is an illustration of an exemplary functional block diagram of a dynamic routing under extreme cognitive jamming environments (RouteEx) system according to an embodiment of the disclosure.
Figure 7:
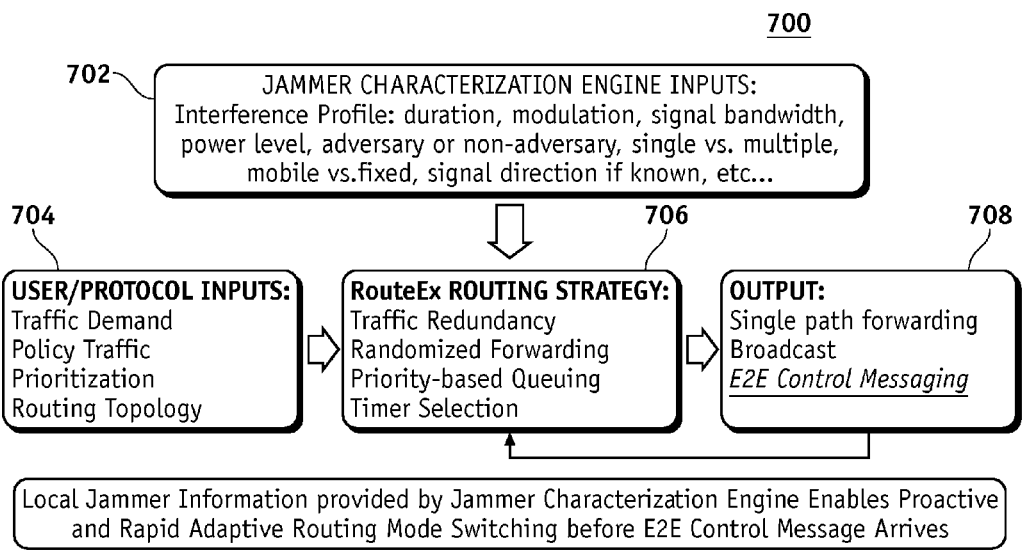
FIG. 7 is an illustration of an exemplary flowchart showing input and output of the RouteEx system of FIG. 6 according to an embodiment of the disclosure.

FIG. 6 is an illustration of an exemplary function block diagram of a dynamic routing under extreme cognitive jamming environments (RouteEx) system 600 according to an embodiment of the disclosure. FIG. 7 is an illustration of an exemplary flowchart 700 showing input and output of the RouteEx system 600 according to an embodiment of the disclosure.

The RouteEx system 600 comprises, a jammer characterization engine 602, a PACJAM-Aware Adaptive Routing (PAAR) module 604, a signal processing module 606, a processor module 612, and a memory module 614.

The jammer characterization engine 602 is configured to rapidly detect and accurately classify and characterize a wide range of PACJAM behaviors seen by individual router nodes such as the router node 502/512. In this manner, the jammer characterization engine 602 detects a plurality of detected jammer behaviors based on one or more signal characteristics of the jammer signals 410. The signal characteristics of the jammer signals 410 may comprise, for example but without limitation, modulation type, center frequency, bandwidth, or other characteristics.

The jammer characterization engine 602 is also configured to classify a network behavioral pattern of the jammer behaviors based on the detected jammer behaviors. The detected jammer behaviors may comprise, for example but without limitation, frequency, spatial, temporal, or other detected jammer behaviors.

The jammer characterization engine 602 comprises an observation database module 608, and a learning and decision making module 610. The jammer characterization engine 602 provides input 702 to the PACJAM-Aware Adaptive Routing (PAAR) module 604.

The observation database module 608 is configured to store, for example but without limitation, channel condition data, periodic traffic, event-driven traffic, SNR of the incoming messages, patterns of communications between router nodes 502/508/512, timing and latency of control messages, or other data.

The learning and decision making module 610 is configured to provide a jammer characterization engine state as explained in more detail below in the context of discussion of FIG. 8 below.

Existing jammer detection strategies typically depend on a communication channel 624 monitoring and SNR analysis. Energy based jammers transmit such as energy based jammers 108 in FIG. 1 with a high duty cycle in order to simply occupy the communication channel and thus prevent usage of the communication channel by friendly nodes such as the router 512 from router nodes of the ad-hoc wireless network 500. On the other hand, reactive jammers transmit only when there is activity on the communication channel 624. Since all wireless network protocols must deal with naturally occurring phenomena (such as fading), they have redundancies built in to handle such effects.

Successful jammers must be persistent and strong in order to overcome the inherent robustness of the wireless network protocols which makes them relatively vulnerable to the tradition detection strategies. PACJAM, on the other hand, attempts to surgically attack only the critical portions of the traffic which makes it extremely difficult to detect using standard techniques. Due to its robust design, control messages are extremely unlikely to suffer catastrophic failure. By comprehensively monitoring the communication channel 624 conditions, the jammer characterization engine 602 detects the subtle patterns that lead to the network disruption and triggers the protective mechanisms to deal with PACJAM.

Comprehensive communication channel 624 monitoring is done by observing not only the SNR of the incoming messages, but the patterns of communications between router nodes 502/512, and the timing and latency of control messages. The network behavior is learned by collecting statistics about periodic traffic (e.g., 'Hello' messages) and event-driven traffic (e.g., a typical acknowledgment of some sort). The jammer characterization engine 602, which operates independently at each router node 502/512, comprises the knowledge of the message source 404 and destination node 406 and can build statistical behavior models for each of the router nodes 502/512 in its vicinity. This allows monitoring the dropped packets and determining the likely cause.

The PACJAM-Aware Adaptive Routing (PAAR) module 604 is configured to leverage the obtained knowledge by the jammer characterization engine 602 to adapt rapidly and proactively dynamic routing strategies to achieve robust data delivery by avoiding the nodes and routes such as the node 502 that comprises the most interfering signals. The PACJAM-Aware Adaptive Routing (PAAR) module 604 receives jammer characterization engine input 702 from the jammer characterization engine 602 and user/protocol inputs 704, and generates RouteEx routing strategy 706 to provide output 708.

The jammer characterization engine input 702, may comprise for example but without limitation, interference profile such as: duration, modulation, signal bandwidth, power level, adversary, non-adversary, single vs. multiple, mobile vs. fixed, signal direction if known, and/or other data. The user/protocol inputs 704 may comprise for example but without limitation traffic demand, policy traffic, prioritization, routing topology, and/or other data. The RouteEx routing strategy 706 may comprise for example but without limitation, traffic redundancy, randomized forwarding, priority-based queuing, timer selection, and/or other data. The output 708 may comprise for example but without limitation, signal path forwarding, broadcast, control messaging, or other data.

The PACJAM-Aware Adaptive Routing (PAAR) module 604 (adaptive router) is configured to adapt dynamic routing strategies of the router node 502/508/512 to achieve robust data delivery based on the network behavioral pattern without explicit coordination. The PACJAM-Aware Adaptive Routing (PAAR) module 604 (adaptive router) routes data packets 506 sent by the router node 502 to avoid nodes 508 and routes 510 that comprise the jammer signals 410.

A goal is to leverage the interference/jammer characteristics captured by the jammer characterization engine 602 into actionable, adaptive routing strategies so that the routing layer can react accordingly without changing the core algorithms. The information to be captured at the jammer characterization engine 602 in terms of interference classification may comprise, for example but without limitation, sojourn times at observed frequencies with corresponding power levels, hopping patterns and their speed, types of jammers (intelligent vs. traditional, DSA-capable or not, PHY-only vs. spoofed data with matching modulation, etc.), persistency, direction of signal, a combination thereof, or other data.

The RouteEx system 600 utilizes cognitive jamming interference specific information in an adaptive dynamic routing mechanism. An Adaptive Routing protocol (also known as Multi-Mode Robust Routing (MMRR or M2R2)) is developed under an Office of Naval Research (ONR) program: "Dynamic Tactical Communication Network" (DTCN), as an implementation framework in which the new mechanisms developed under this program can be directly applied.

Figure 11:
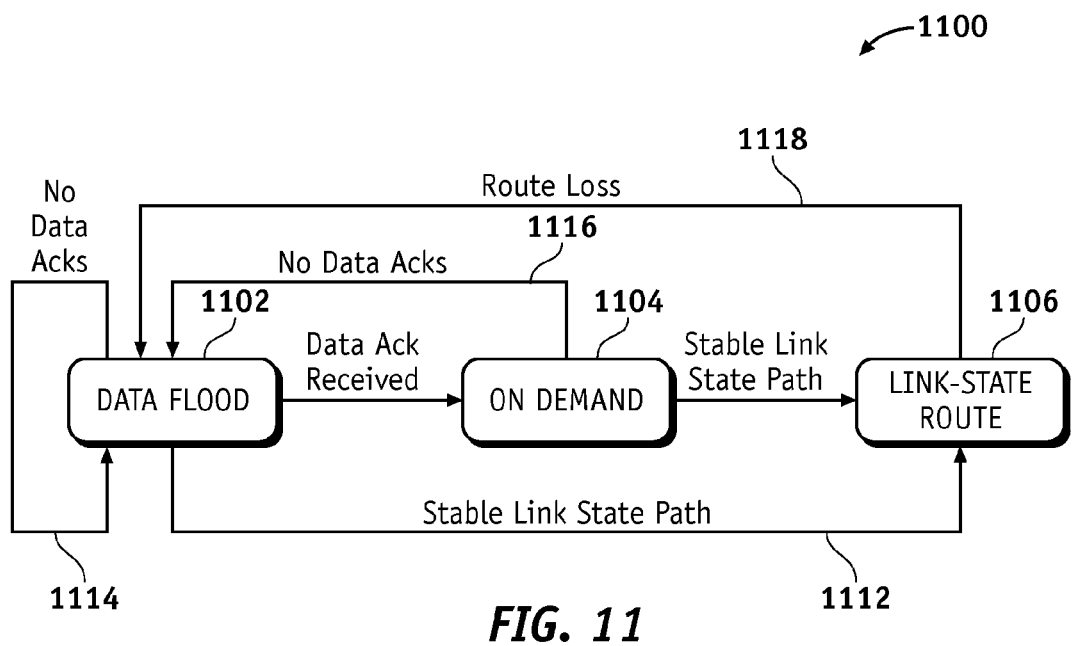
FIG. 11 is an illustration of an exemplary adaptive routing of a RouteEx system according to an embodiment of the disclosure.

The Adaptive Routing protocol can switch between different modes of operation (proactive (topology-based link-state 1106), reactive (on-demand 1104), and flooding (flooding protocol 1102) (e.g., broadcasting) independently at each router node 502/508/512, depending on the end-to-end network conditions for a certain route as shown in FIG. 11 below. This allows dynamically increasing forwarding redundancy in the data plane for traffic flows of high criticality when the network is arbitrarily disrupted by an intelligent jammer.

Adaptive Routing framework uses a very simple policy for switching between the three routing protocols: the flooding protocol 1102, the on-demand protocol 1104, or the topology-based link state protocol 1106. In the Adaptive Routing framework nodes can be in different states for different routes at the same time, and the transition between states requires no explicit coordination between network nodes. First, priority is given to the link state protocol. If a stable link state route for a certain destination exists at some node, that node will use the stable route. When that route fails—the link state protocol 1106 loses the route due to topology changes—the node switches the route to a combination of the flooding protocol 1102 and the on-demand protocol 1104, and keeps the route in that state until a new link state forwarding path is created, and that path proves to be stable for a certain interval of time. During this time, the protocol uses end-to-end feedback from the destination to adjust the multi-path forwarding between the source and destination dynamically.

A strategy of relying on the end-to-end feedback from the intended destination creates a major vulnerability in a presence of a malicious RF jammer: adaptation latency or responsiveness. An effective, intelligent jammer would be able to observe and disrupt "stable" routes in such a way that no stable routes may be formed. The original Adaptive Routing will "eventually" detect the disruption, and resort to the flooding protocol 1102. However, depending on an effectiveness of the jammer that exploits periodicity of the routing protocol's control messages, it may take considerable amount of time until detection of failed routes.

Additional, local information from the interference classifier can enhance the responsiveness as well as robustness of the routing scheme. It does so by allowing the routing protocol to react to locally detected attacks immediately, instead of relying solely on end-to-end feedback from the destination routers.

Based on local information from the interference classifier the protocol can immediately switch from the topology-based Link-State protocol 1106 to the on-demand protocol 1104 or to the flooding protocol 1102 upon detection of a malicious intent, depending on the traffic priority. This makes the protocol able to use more network resources, adding redundancy in the forwarding plane, to deal with the uncertainty of the network availability dynamics. Moreover, the extent of redundancy can also be adjusted based on the detected magnitude of the jammer attack, to preserve required end-to-end traffic characteristics of the flow (delivery ratio, latency).

During this phase, the on-demand protocol 1104 of Adaptive Routing provides end-to-end feedback through a set of Data Acknowledgements that are either broadcast throughout the network or forwarded over the multi-path data routes back to the source. These Data Acknowledgements carry real-time information about the observed performance of the corresponding data flow, and thus the redundancy factor of the data duplication in the on-demand protocol 1104 can be adjusted. This allows continuous functionality of the forwarding plane, even under attack.

The signal processing module 606 is configured for waveform detection and PACJAM classification. Emerging and future cognitive threat emitters facing Navy and Marine Corps missions vary widely. Communications targets comprise narrowband continuous waveform (CW) signals, co-channel (in time and frequency) spread-spectrum signals spanning several megahertz (MHz) of instantaneous bandwidth, widely spread frequency hopping or other low probability of intercept (LPI) waveforms, and very broadband high data rate links. Jammers span the gamut from high power barrage jammers to surgical low power, low duty cycle jamming waveforms that disrupt or degrade communications but are difficult to detect.

The traditional challenges of detecting pulsed, CW and co-channel emitters, coupled with emerging wide band transceiver and cognitive threats pose a formidable sparse time-frequency-bandwidth-waveform search for achieving the goals of the RouteEx system 600. An important design objective is to accomplish this search with high probability of detection, low latency, and low probability of false alarm to ensure mission effectiveness. Embodiments combine several technology methods that address a broad range of emitter types that comprise the wideband cognitive jammers.

The various illustrative blocks, modules, processing logic, and circuits described in connection with the system 600 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein.

The illustrated system 600 depicts a simple embodiment for ease of description. These and other elements of the system 600 are interconnected together, allowing communication between the various elements of the system 600. In one embodiment, these and other elements of the system 600 may be interconnected together via a data communication bus 616.

The receiver module 618 is configured to receive the network information via an antenna 630. The receiver module 618 is configured to scan for the jammer signals 410 emitted by the network protocol-aware cognitive jammer 402 at the router node 502 in the ad-hoc wireless network 500.

The transmitter module 620 is configured to transmit broadcast information. The transmitter module 620 delivers robust data under disconnected, intermittent, and low bandwidth (DIL), RF interferences by intentional, covert and cognitive jammer, or a combination thereof.

The network communication module 622 is configured to enable the communication channels 624 for communication with the system 600.

The receiver module 618 and the transmitter module 620 are coupled to their respective antenna 630/632. Although in a simple version of the system 600 only one antenna 630 for receiving information and only one antenna 632 for transmitting information may be required, a more sophisticated system 600 may be provided with multiple and/or more complex antenna configurations. Additionally, although not shown in this FIG. 6, those skilled in the art will recognize that a transmitter may transmit to more than one receiver, and that multiple transmitters may transmit to the same receiver.

Processor module 612 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor modules 612 comprise processing logic that is configured to carry out the functions, techniques, and processing tasks associated with the operation of the system 600.

In particular, the processing logic is configured to support the RouteEx system 600. For example, the processor module 612 may be suitably configured to direct the jammer characterization engine 602 to detect and accurately classify and characterize a wide range of PACJAM behaviors seen by individual router nodes from router nodes 502. For another example, the processor module 612 may be suitably configured to direct the PACJAM-Aware Adaptive Routing (PAAR) module 604 to leverage the obtained knowledge to adapt rapidly and proactively dynamic routing strategies.

Furthermore, the steps of a method or algorithm described in connection with the embodiments disclosed herein may be embodied directly in hardware, in firmware, in a software module executed by processor module 612, or in any practical combination thereof.

The memory module 614, may be realized as a non-volatile storage device (non-volatile semiconductor memory, hard disk device, optical disk device, and the like), a random access storage device (for example, SRAM, DRAM), or any other form of storage medium known in the art. The memory module 614 may be coupled to the processor module 612 respectively such that the processor module 612 can read information from and write information to memory module 614.

As an example, the processor module 612 and memory module 614, may reside in their respective ASICs. The memory module 614 may also be integrated into the processor modules 612 respectively. In an embodiment, the memory module 614 may include a cache memory for storing temporary variables or other intermediate information during execution of instructions to be executed by processor module 612. The memory module 614 may also include non-volatile memory for storing instructions to be executed by the processor module 612.

The memory module 614 may include the observation database module 608 for storing data in accordance with an embodiment of the disclosure as explained above. The observation database module 608 may be configured to store, maintain, and provide data as needed to support the functionality of the system 600 in the manner described below. Moreover, the observation database module 608 may be a local database coupled to the processor module 612, or may be a remote database, for example, a central network database, and the like. The observation database module 608 may include a lookup table for purposes of storing the data. The memory module 614 may also store, a computer program that is executed by the processor module 612, an operating system, an application program, tentative data used in executing a program processing, or other application.

Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 8:
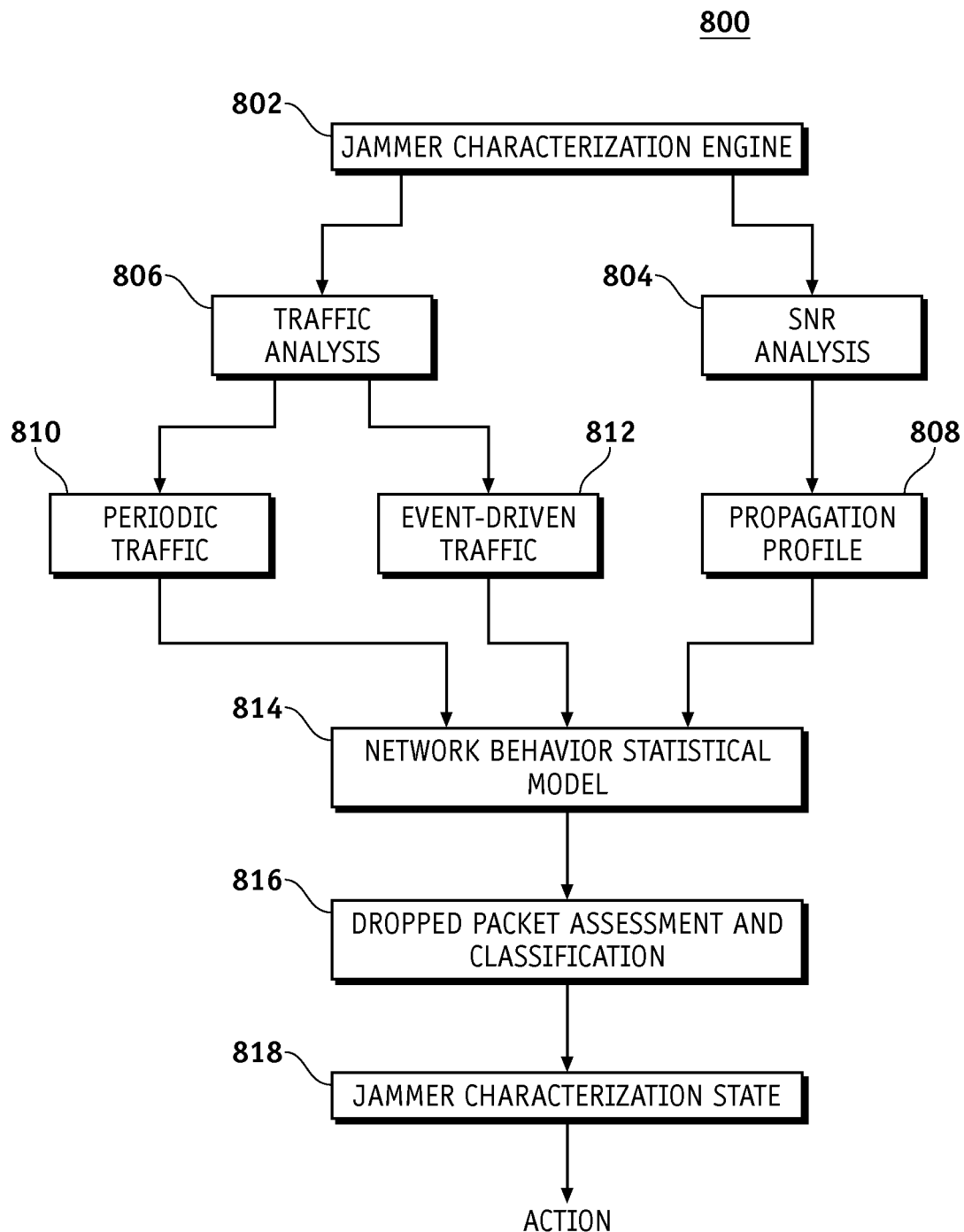
FIG. 8 is an illustration of an exemplary functional block diagram showing a detail of the jammer characterization engine of FIG. 6 according to an embodiment of the disclosure.

FIG. 8 is an illustration of an exemplary functional block diagram 800 showing a detail of the learning and decision making module 610 of the jammer characterization engine 602/802 according to an embodiment of the disclosure.

The learning and decision making module 610 comprises a traffic analysis module 806, an SNR analysis module 804, and a network behavior statistical analysis module 814.

The traffic analysis module 806 and the SNR analysis module 804 independently of each other analyze the network behavior and the communication channel 624 conditions based on the data from the observation database module 608.

The traffic analysis module 806 outputs periodic traffic 810 and event-driven traffic 812 based on the data from the observation database module 608 to provide traffic analysis data.

The SNR analysis module 804 outputs a propagation profile 808 based on the data from the observation database module 608 to provide SNR analysis data.

The network behavior statistical analysis module 814 monitors both periodic traffic 810 and event-driven traffic 812 to establish baseline patterns of operation for the system 600. The network behavior statistical analysis model module 814 combines the traffic analysis data and the SNR analysis data to provide a comprehensive network behavior statistical model which is then used to assess the dropped packets and classification 816 (accesses interference classification), and makes a decision whether jamming is taking place to provide a jammer characterization engine state 818 as described below in the context of discussion of FIGS. 9-10.

FIG. 9 is an illustration of an exemplary table 900 showing states of a RouteEx system 600 according to an embodiment of the disclosure. The jammer characterization engine 602 can be in the following states as shown in FIG. 9 based on the dropped packet assessment and classification: Normal state 902, no jamming behavior detected; Possible jamming condition state 904, further analysis in progress; and Jamming detected state 906, jammer classification output is generated.

FIG. 10 is an illustration of an exemplary state transition 1000 of a RouteEx system 600 according to an embodiment of the disclosure. The jammer characterization engine 602 comprises a state transitions as shown in FIG. 10. Transition from "jamming detected state" 1006 to "normal state" 1002 can optionally go through "possible jamming state" 1004.

FIG. 11 is an illustration of an exemplary adaptive routing 1100 of a RouteEx system 600 according to an embodiment of the disclosure. The adaptive routing 1100 blends the flooding protocol 1102 (data flood, broadcast protocol), the on-demand protocol 1104 (reactive protocol) and the topology-based link state protocol 1106 (link-state route protocol 1106, proactive protocol) without requiring tight coordination between routers. As explained above, the RouteEx system 600 can switch between different these modes of operation (e.g., proactive, reactive, and flooding) independently at each router node 502/512, depending on end-to-end (E2E) conditions of the ad-hoc wireless network 500 for a certain route. This allows dynamically increasing forwarding redundancy in a data plane for traffic flows of high importance when a network is arbitrarily disrupted by an intelligent jammer.

The RouteEx system 600 uses a very simple policy for switching between the three routing protocols: the flooding protocol 1102, the on-demand protocol 1104, or topology-based link state protocol 1106. The RouteEx system 600 framework router nodes such as the router nodes 502/512 can be in different states for different routes at the same time, and a transition between states such as the states 1002, 1004, and 1006 in FIG. 10 requires no explicit coordination between router nodes of the ad-hoc wireless network 500. First, priority is given to the link state protocol 1106. If a stable link state route 1112 for a certain destination exists at some router node, that router node will use the stable link state route 1112. When that route fails (e.g., the link state protocol 1106 has a route loss 1118 due to topology changes), the router node (e.g., 502, 512, FIG. 5) switches route to a combination of the flooding protocol 1102 and on-demand protocol 1104. The router node (e.g., 502, 512) also keeps the route in that state (e.g., via no data acks 1114, 1116) until a new link state forwarding path is created, and that path proves to be stable for a certain interval of time. During this time, the RouteEx system 600 protocol uses end-to-end feedback from the destination to adjust multi-path forwarding between a source node such as the source node 404 (FIG. 4) and a destination node such as the destination node 406 dynamically.

Figure 12:
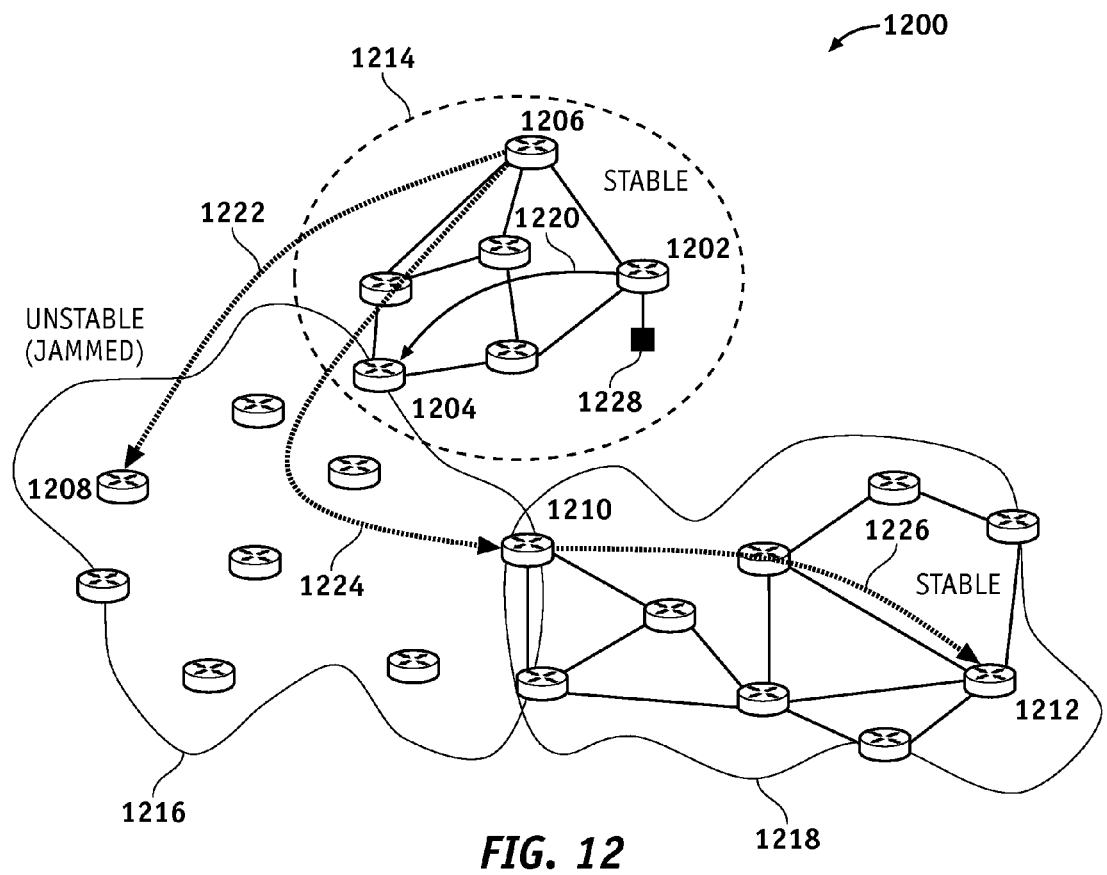
FIG. 12 is an illustration of an exemplary adaptive routing of a RouteEx system according to an embodiment of the disclosure.

FIG. 12 is an illustration of an exemplary adaptive routing 1200 of a RouteEx system 600 using per flow forwarding and independent decisions at each node according to an embodiment of the disclosure. A packet 1228/506 is to be routed from a source node 1202 in a stable (non-jammed) region 1214 to a destination node 1212. Under non-jamming conditions, the packet 1228 would be routed through a shortest path 1220 through a node 1204. However under jamming conditions an unstable jammed network region 1216 will not provide a stable path. Nodes of the stable region 1214 probe the unstable region 1216 finding accessible nodes such as a node 1208 via a path 1222. Thereby, the Route EX system 600 can find a dynamic path 1224 via node 1206 to a node 1210 in a stable region 1218 comprising the destination node 1212, and thereby through a path 1226 to the destination node 1212.

Figure 13:
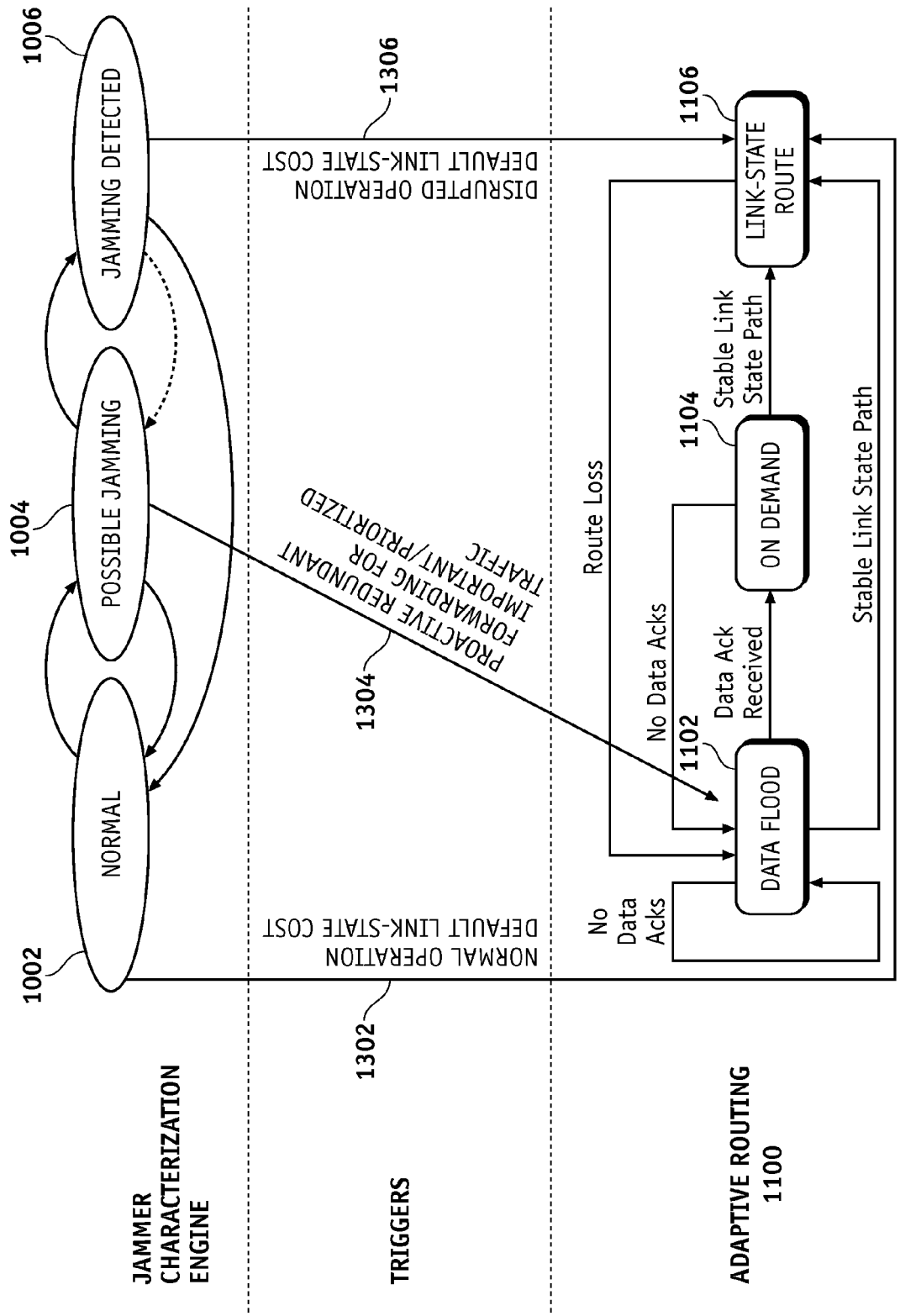
FIG. 13 is an illustration of an exemplary adaptive routing of a RouteEx system according to an embodiment of the disclosure.

FIG. 13 is an illustration of an exemplary adaptive routing 1300 of a RouteEx system 600 according to an embodiment of the disclosure. A strategy of relying on end-to-end feedback from an intended destination creates a major vulnerability in a presence of a malicious jammer. An effective, intelligent jammer would be able to observe and disrupt "stable" routes such as the stable link state route 1110 in such a way that no stable routes may be formed. Adaptive routing may eventually detect a disruption, and resort to the flooding protocol 1102.

However, depending on an effectiveness of a jammer that exploits periodicity of a routing protocol's control messages, a considerable amount of time may occur until detection of failed routes. Thus, additional local information from the interference classifier 816 (FIG. 8) can enhance routing responsiveness as well as robustness. Routing responsiveness as well as robustness enhanced by allowing the routing protocol to react to locally detected attacks immediately, instead of relying solely on end-to-end feedback from destination routers. Based on local information from the interference classifier 816, the routing protocol can substantially immediately switch from the topology-based link state protocol 1106 to the on-demand protocol 1104 or the flooding protocol 1102 (e.g., depending on traffic priority) upon detection of a malicious intent. This makes the routing protocol able to use more network resources, adding redundancy in the forwarding plane, to deal with uncertainty of network availability dynamics.

In the normal state 1002 a normal operation with default link-state cost 1302 is triggered to the topology-based link state protocol 1106. In the jamming detected state 1006, a disrupted operation with increased link-state cost 1306 is triggered to the topology-based link state protocol 1106. In the possible jamming state 1004, a proactive redundant forwarding for important/prioritized traffic 1304 is triggered to the flooding protocol 1102.

Figure 14:
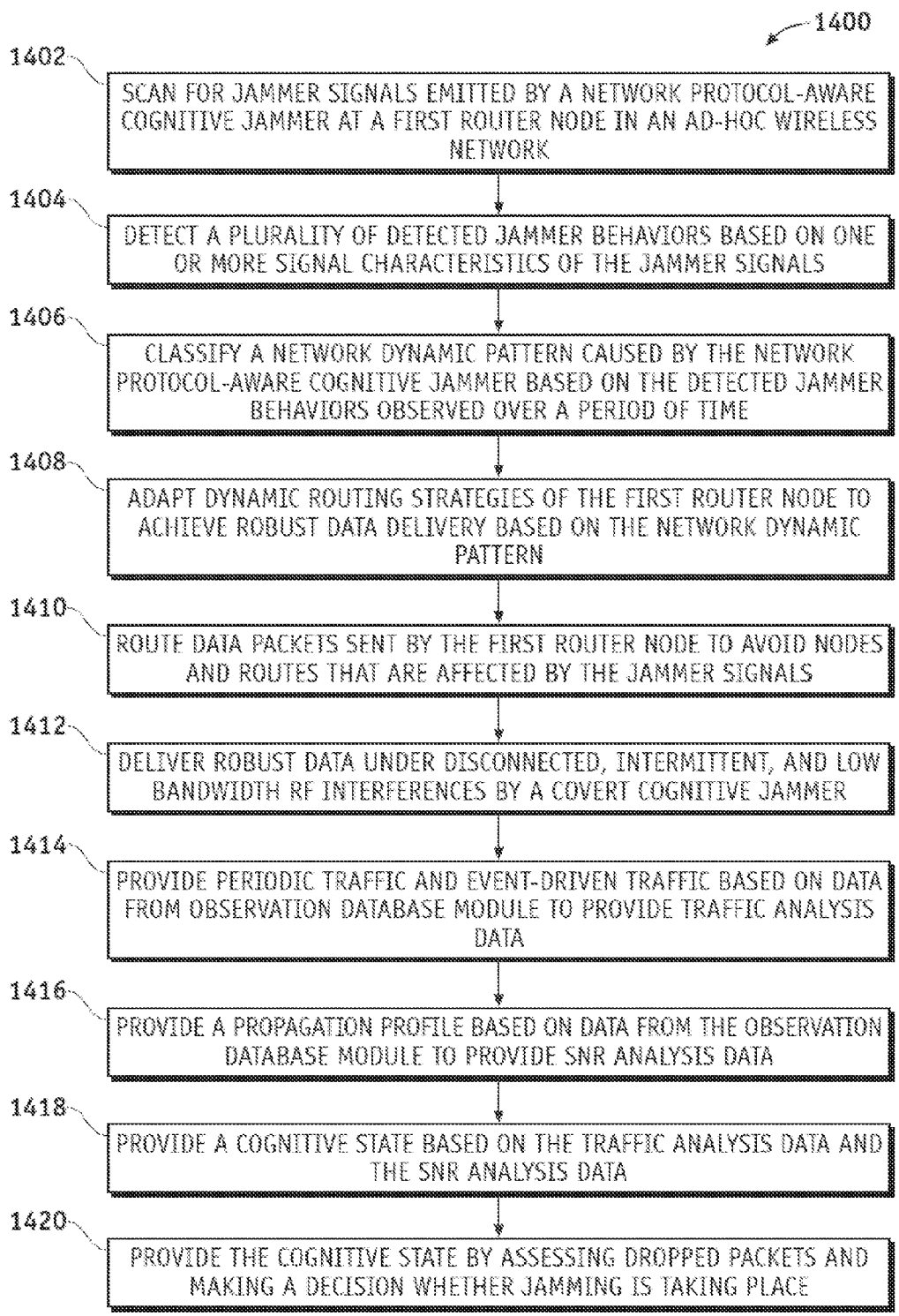
FIG. 14 is an illustration of an exemplary flowchart of a dynamic routing under extreme cognitive jamming environments process according to an embodiment of the disclosure.

FIG. 14 is an illustration of an exemplary flowchart showing a dynamic routing under extreme cognitive jamming environments process according to an embodiment of the disclosure. The various tasks performed in connection with the process 1400 may be performed by software, hardware, firmware, a computer-readable medium having computer executable instructions for performing the process method, or any combination thereof. The process 1400 may be recorded in a computer-readable medium such as a semiconductor memory, a magnetic disk, an optical disk, and the like, and can be accessed and executed, for example, by a computer CPU such as the processor module 612 in which the computer-readable medium is stored.

It should be appreciated that process 1400 may include any number of additional or alternative tasks, the tasks shown in FIG. 14 need not be performed in the illustrated order, and process 1400 may be incorporated into a more comprehensive procedure or process having additional functionality not described in detail herein. In practical embodiments, portions of the process 1400 may be performed by different elements of the system 600 such as jammer characterization engine 602, the PACJAM-Aware Adaptive Routing (PAAR) module 604, the processor module 612, the memory module 614, etc. Process 1400 may have functions, material, and structures that are similar to the embodiments shown in FIGS. 1-3. Therefore common features, functions, and elements may not be redundantly described here.

Process 1400 may begin by scanning for jammer signals such as the jammer signals 410 emitted by a network protocol-aware cognitive jammer such as the jammer 402 at a first router node such as the router node 502 in an ad-hoc wireless network such as the ad-hoc wireless network 500 (task 1402).

Process 1400 may continue by detecting a plurality of detected jammer behaviors based on one or more signal characteristics of the jammer signals 410 (task 1404).

Process 1400 may continue by classifying a network dynamic pattern caused by the network protocol-aware cognitive jammer 402 based on the detected jammer behaviors observed over a period of time (task 1406).

Process 1400 may continue by adapting dynamic routing strategies of the first router node 502 to achieve robust data delivery based on the network dynamic pattern (task 1408).

Process 1400 may continue by routing data packets such as the data packet 506 sent by the first router node 502 to avoid nodes and routes that are affected by the jammer signals 410 (task 1410).

Process 1400 may continue by delivering robust data under Disconnected, Intermittent and Low (or Limited) bandwidth (DIL) RF interferences by a cognitive jammer (task 1412). The cognitive jammer may be intentional, covert, or a combination thereof.

Process 1400 may continue by providing periodic traffic and/or event-driven traffic based on data from observation database module such as the observation database module 608 to provide traffic analysis data (task 1414).

Process 1400 may continue by providing a propagation profile based on data from the observation database module to provide SNR analysis data (task 1416).

Process 1400 may continue by providing a cognitive state based on the traffic analysis data and the SNR analysis data (task 1418).

Process 1400 may continue by providing the cognitive state by assessing dropped packets and making a decision whether jamming is taking place (task 1420).

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor modules 612 to cause the processor modules 612 to perform specified operations. Such instructions, generally referred to as "computer program code" or "program code" (which may be grouped in the form of computer programs or other groupings), when executed, enable a method of using a system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 6-8, and 11-13 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for dynamic routing under extreme cognitive jamming environments, the method comprising:
   autonomously scanning for jammer signals emitted by a network protocol-aware cognitive jammer at a first router node in an ad-hoc wireless network, wherein the scanning is waveform-agnostic and the jammer signals comprise protocol control messages of a routing layer of a routing protocol;
   detecting at the routing layer of the routing protocol a plurality of detected jammer behaviors based on one or more signal characteristics of the jammer signals;
   classifying a network dynamic pattern caused by the network protocol-aware cognitive jammer based on the detected jammer behaviors at the routing layer observed over a period of time;
   adapting dynamic routing strategies of the first router node at the routing layer to achieve robust data delivery based on the network dynamic pattern;
   responding rapidly to local detection of the detected jammer behaviors by finding an alternate path via the dynamic routing strategies, thereby shortening a reaction time to detection of the jammer behaviors by detecting the jammer signals in the protocol control messages of the routing layer instead of data packets; and
   routing data packets sent by the first router node through the alternate path to avoid nodes and routes that are affected by the jammer signals.

2. The method of claim 1, further comprising delivering robust data under disconnected and intermittent RF interferences by the cognitive jammer.

3. The method of claim 1, further comprising providing observed periodic traffic or event-driven traffic of the routing protocol based on data from an observation database module to provide traffic analysis data.

4. The method of claim 3, further comprising providing a propagation profile based on observed signal-to-noise ratio (SNR) data of the protocol control messages from the observation database module to provide SNR analysis data.

5. The method of claim 4, further comprising providing a cognitive state based on the traffic analysis data and the SNR analysis data.

6. The method of claim 5, further comprising providing the cognitive state by assessing dropped packets and making a decision whether jamming is taking place.

7. A system for dynamic routing under extreme cognitive jamming environments, the system comprising:
a first router node in an ad-hoc wireless network;
a receiver operable to autonomously scan for jammer signals emitted by a network protocol-aware cognitive jammer at the first router node, wherein the scan is waveform-agnostic and the jammer signals comprise protocol control messages of a routing layer of a routing protocol;
a jammer characterization engine operable to:
detect at the routing layer of the routing protocol a plurality of detected jammer behaviors based on one or more signal characteristics of the jammer signals; and
classify a network dynamic pattern caused by the network protocol-aware cognitive jammer based on the detected jammer behaviors at the routing layer observed over a period of time; and
an adaptive router operable to:
adapt dynamic routing strategies of the first router node at the routing layer to achieve robust data delivery based on the network dynamic pattern;
respond rapidly to local detection of the detected jammer behaviors by finding an alternate path via the dynamic routing strategies, thereby shortening a reaction time to detection of the jammer behaviors by detecting the jammer signals in the protocol control messages of the routing layer instead of data packets; and
route data packets sent by the first router node through the alternate path to avoid nodes and routes that are affected by the jammer signals.

8. The system of claim 7, further comprising a transmission module operable to deliver robust data under an extreme jamming environment comprising: Disconnected, Intermittent and Low bandwidth (DIL), RF interferences by intentional, covert and cognitive jammer, or a combination thereof.

9. The system of claim 8, further comprising a traffic analysis module operable to provide observed periodic traffic and event-driven traffic of the routing protocol based on data from observation database module to provide traffic analysis data.

10. The system of claim 9, further comprising a signal to noise ratio (SNR) analysis module operable to provide a propagation profile based on observed SNR data of the protocol control messages from the observation database module to provide SNR analysis data.

11. The system of claim 10, further comprising a network behavior statistical analysis module operable to provide a cognitive state based on the traffic analysis data and the SNR analysis data.

12. The system of claim 11, wherein the jammer characterization engine provides the cognitive state by assessing dropped packets and making a decision whether jamming is taking place.

13. The system of claim 12, wherein the cognitive state comprises a state where no jamming behavior is detected, a possible jamming condition state where further analysis is in progress, or a jamming detected state where a jammer classification output is generated.

14. A non-transitory computer readable storage medium comprising computer-executable instructions for dynamic routing under extreme cognitive jamming environments, the computer-executable instructions comprising:
autonomously scanning for jammer signals emitted by a network protocol-aware cognitive jammer at a first router node in an ad-hoc wireless network, wherein the scanning is waveform-agnostic and the jammer signals comprise protocol control messages of a routing layer of a routing protocol;
detecting at the routing layer of the routing protocol a plurality of detected jammer behaviors based on one or more signal characteristics of the jammer signals;
classifying a network dynamic pattern caused by the network protocol-aware cognitive jammer based on the detected jammer behaviors at the routing layer observed over a period of time;
adapting dynamic routing strategies of the first router node at the routing layer to achieve robust data delivery based on the network dynamic pattern;
responding rapidly to local detection of the detected jammer behaviors by finding an alternate path via the dynamic routing strategies, thereby shortening a reaction time to detection of the jammer behaviors by detecting the jammer signals in the protocol control messages of the routing layer instead of data packets; and
routing data packets sent by the first router node through the alternate path to avoid nodes and routes that are affected by the jammer signals.

15. The non-transitory computer readable storage medium of claim 14, further comprising computer-executable instructions comprising delivering robust data under an extreme jamming environment comprising: disconnected, intermittent, and low bandwidth (DIL), RF interferences by intentional covert and cognitive jammer, or a combination thereof.

16. The non-transitory computer readable storage medium of claim 15, further comprising computer-executable instructions comprising providing observed periodic traffic and event-driven traffic of the routing protocol based on data from observation database module to provide traffic analysis data.

17. The non-transitory computer readable storage medium of claim 16, further comprising computer-executable instructions comprising providing a propagation profile based on observed signal-to-noise ratio (SNR) data of the protocol control messages from the observation database module to provide SNR analysis data.

18. The non-transitory computer readable storage medium of claim 17, further comprising computer-executable instructions comprising providing a cognitive state based on the traffic analysis data and the SNR analysis data.

19. The non-transitory computer readable storage medium of claim 18, further comprising computer-executable instructions comprising providing the cognitive state by assessing dropped packets and making a decision whether jamming is taking place.

20. The non-transitory computer readable storage medium of claim 19, wherein the cognitive state comprises a state where no jamming behavior is detected, a possible jamming condition state where further analysis is in progress, or a jamming detected state where a jammer classification output is generated.

* * * * *